(12) United States Patent
Nakahara

(10) Patent No.: US 6,834,573 B1
(45) Date of Patent: Dec. 28, 2004

(54) SAW BLADE

(75) Inventor: Katsumi Nakahara, Hyogo (JP)

(73) Assignee: Amada Company, Limited (JP)

( * ) Notice: Subject to any disclaimer, the term of this patent is extended or adjusted under 35 U.S.C. 154(b) by 0 days.

(21) Appl. No.: 09/597,159

(22) Filed: Jun. 20, 2000

(30) Foreign Application Priority Data

Jun. 22, 1999 (JP) .............................. 11-175943
May 23, 2000 (JP) ....................... 2000-151955

(51) Int. Cl.[7] .............................................. B27B 33/02
(52) U.S. Cl. .............................. 83/851; 83/835; 83/848
(58) Field of Search ......................... 83/835, 848, 849, 83/846, 851, 854, 855, 676, 838, 847

(56) References Cited

U.S. PATENT DOCUMENTS

| | | | | |
|---|---|---|---|---|
| 552,370 A | * | 12/1895 | Holley | 83/855 |
| 615,005 A | * | 11/1898 | Walquist | 83/676 |
| 820,969 A | * | 5/1906 | Grelock | 83/851 |
| 2,415,271 A | * | 2/1947 | Baumann | 83/855 |
| 3,292,674 A | * | 12/1966 | Turner | 83/848 |
| 3,745,869 A | * | 7/1973 | Ludwig | 83/846 |
| 4,292,871 A | * | 10/1981 | Neumeyer et al. | 83/835 |
| 4,867,026 A | * | 9/1989 | Henning et al. | 83/835 |
| 4,958,546 A | * | 9/1990 | Yoshida et al. | 83/848 |
| 6,003,422 A | * | 12/1999 | Holsten | 83/846 |
| 6,158,324 A | * | 12/2000 | Kullmann et al. | 83/848 |
| 6,167,792 B1 | * | 1/2001 | Korb et al. | 83/835 |
| 6,220,139 B1 | * | 4/2001 | Kobayashi et al. | 83/835 |
| 6,269,722 B1 | * | 8/2001 | Hellbergh | 83/848 |

FOREIGN PATENT DOCUMENTS

| JP | 04158997 | 6/1992 |
|---|---|---|
| JP | 04158998 | 6/1992 |

* cited by examiner

*Primary Examiner*—Hwei-Siu Payer
(74) *Attorney, Agent, or Firm*—Blank Rome LLP

(57) ABSTRACT

A saw blade which has an unset tooth and left and right set teeth which are set to a right-and-left direction that, when a thickness of a body section of the saw blade is D and a set width is T, a relationship that $T=D+2\alpha$; when the thickness D of the body section and the coefficient $\alpha$ establish a relationship that $0.85 \leq D \leq 0.95$; $0.15 \leq \alpha \leq 0.35$. In addition, when $0.96 < D \leq 1.2$, $0.2 \leq \alpha \leq 0.4$ is established; when $1.2 < D \leq 1.5$, $0.25 \leq \alpha \leq 0.43$ is established; when $1.5 < D \leq 1.7$, $0.3 \leq \alpha \leq 0.5$ is established; and when $1.7 < D$, $0.35 \leq \alpha \leq 0.6$ is established.

3 Claims, 7 Drawing Sheets

SAW BLADE

BACKGROUND OF THE INVENTION

1. Field of the Invention

The present invention relates to saw blades such as circular saw blade, band saw blade and the like. More specifically, the invention relates to a saw blade in which the cutting force is further weakened so that the life of a body section of the saw blade is improved.

2. Description of the Related Art

Conventionally, the saw blade generally has a structure which includes an unset tooth which is not set to a left-and-right direction viewed from a cutting direction of the saw blade, and left and right set teeth which are set to the right-and-left direction. In order to improve an ejection characteristic of chips generated at the time of cutting a workpiece and prevent a phenomenon that the saw blade is caught in a cutting groove of the workpiece, the width should be generally set to be larger so that a gap between an inner face of the cutting groove and a body section side face of the saw blade becomes large when the cutting groove is worked on the workpiece.

When a setting amount of the left and right set teeth is set to be large so that the set width becomes large as mentioned above, a burden on the unset tooth and the left and right set teeth increases, and thick chips which are approximately equal to the thickness of the respective teeth are generated. As a result, the ejection characteristic of the chips is deteriorated. Moreover, the left and right set teeth have a tendency to be bent greatly to the right-and-left direction and to be elastically deformed due to the component of force in the right-and-left direction at the time of cutting.

Therefore, a height difference is given to the dimensions of the plural saw teeth, and the set width of the set teeth with small height is set to be larger than the set width of the left and right set teeth with large height. As a result, a burden on the respective saw teeth is reduced and the chips are finely divided. With such a structure, abrasion of the saw teeth is reduced, and the life of the saw blade and the cutting characteristic can be improved.

However, when the set width is large, the bending of the set teeth to the right-and-left direction is large so that the set teeth are inclined greatly. When the chips S are generated continuously for a long time at the time of cutting the workpiece W, as schematically shown in FIG. 9, the chips have a tendency to flow to a direction which crosses the saw blade BS. As a result, the chips S easily enter a gap SL between the side face of the saw blade BS and an inner face of a cutting groove G and are easily caught, and the gap SL is easily clogged by the chips S. Therefore, there is a problem which should be improved further in the disposal of the chips. In this case, it is considered that a chip breaker be formed at the points of the respective saw teeth so as to cut the chips generated at the time of cutting a workpiece into pieces. However, the cut chips remain in a gullet of the saw blade, and it is undesirable that the chips cut into pieces in the gullet be again cut by the saw teeth.

Prior examples (e.g., Japanese Patent Application Laid-Open Nos. 6-716 and 6-717) disclose a curl forming section formed at the points of the saw teeth so as to curl the chips into a small spring shape considering the ejection characteristic and disposal characteristic of the chips generated at the time of cutting a workpiece.

In the prior saw blades, the set width of the saw blade is set to be large and the width of the cutting groove is set to be large so that the gap between the inner face of the cutting groove and the side face of the saw blade becomes large and the gap is prevented from being clogged by the chips.

Therefore, in the prior saw blades, as the set width of the saw blade is set to be larger, the bending of the set teeth is larger and their inclination becomes great. Moreover, an amount of the chips generated by cutting a workpiece is larger, and the whole cutting force becomes large so that a large force is created due to the body section of the saw blade. Further, even if the chips are curled, the chips have a tendency to gradually come to a sideways direction of the set teeth, namely, a direction of the gap between the side face of the saw blade and the inner face of the cutting groove due to the great inclination of the set teeth. Further, the chips have a tendency to be cut short due to chatter vibration at the time of the cutting. Therefore, the problem of the clogging due to the chips still remains, and the chip disposal after the cutting of workpieces and improvement of the life of the body section of the saw blade becomes problematic. Further, in the case where an expensive material is used, for example, there arises a problem of the material yielding when a lot of chips are generated.

SUMMARY OF THE INVENTION

The present invention has been achieved in order to solve the above problems. It therefore is an object of the present invention to provide a saw blade in which a cutting force is further weakened so that the life of a body section of the saw blade is improved.

To achieve the object, according to a first aspect of the present invention, there is provided a saw blade having an unset tooth and left and right set teeth which are set to a right-and-left direction, wherein when a thickness of a body section of the saw blade is D and a set width is T, a relationship T=D+2α is established; and wherein a relationship between the thickness D of the body section and the coefficient a is established in a manner such that when 0.85 mm≦D≦0.95 mm, 0.15 mm≦α≦0.35 mm is established; when 0.96 mm<D≦1.2 mm, 0.2 mm≦α≦0.4 mm is established; when 1.2 mm<D≦1.5 mm, 0.25 mm≦α≦0.43 mm is established; when 1.5 mm<D≦1.7 mm, 0.3 mm≦α≦0.5 mm is established; and when 1.7 mm<D, 0.35 mm≦α≦0.6 mm is established.

A second aspect of the invention provides a saw blade in which a small-diameter curl forming section for small curling chips generated at the time of cutting a workpiece is provided at a tip portion of saw teeth.

A third aspect of the invention provides a saw blade in which the small-diameter curl forming section has a plane rake face, which extends by a predetermined length from the point of the saw tooth to a direction of a gullet bottom section of the saw blade, and an arc-like curved face which is continuous to the rake face, in the case where a vertical line is drawn from a cross position between the curved face and a gullet forming curved face forming the gullet section towards a direction of the cutting by means of the saw teeth, a dimension from the vertical line to the point of the saw tooth is A, when a radius of the arc-like curved face is R, such that R/2≦A≦2R, where R and A are in millimeters.

A fourth aspect of the invention provides a saw blade in which pitches of the saw teeth are unequal with each other.

A fifth aspect of the invention provides a saw blade having an unset tooth and left and right set teeth which are set to a right-and-left direction; and a small-diameter curl forming section for small curing chips generated at the time of cutting a workpiece at points of saw teeth, that pitches of the saw teeth are unequal with each other, and the small-diameter curl forming section has a plane rake face, which extends by a predetermined length B from the point of the saw tooth to a direction of a gullet bottom section of the saw blade, and an arc-like curved face having a radius R which is continuous to the rake face, and in the case where a vertical line is drawn from a cross position between the curved face and a gullet forming curved face forming the gullet section towards a direction of the cutting by means of the saw teeth, a dimension from the vertical line to the point of the saw tooth is A, a relationship that $A \leq R/2$; $B \leq 2$ mm and $0.5$ mm $\leq R \leq 3$ mm is established.

According to the present invention, since the set width of the saw blade is set to be smaller than the set width of the prior saw blades, the width of the cutting groove of a workpiece becomes narrow. Moreover, the yielding of the workpiece is improved and an amount of the chips generated by the cutting becomes small so that post-processing becomes easy.

In addition, since the set width is set to be small, the whole cutting force becomes small, and the load which is put on the body section of the saw blade is reduced. As a result, the life of the body section can be improved, and noise at the time of the cutting can be reduced, and the accuracy of the cut section can be improved.

Further, since the small-diameter curl forming section having desirable shape is formed at the points of the saw teeth of the saw blade, the chips generated at the time of cutting a workpiece can be curled into a small-diameter spring form. As a result, the chips are prevented from being intertwined each other so that the ejecting characteristic can be improved. Therefore, although the set width of the saw blade is set to be small, the clogging due to the chips is prevented so that a workpiece can be cut.

BRIEF DESCRIPTION OF THE ACCOMPANYING DRAWINGS

The above and further objects and novel features of the present invention will more fully appear from the following detailed description when the same is read in conjunction with the accompanying drawings, in which.

DESCRIPTION OF THE PREFERRED EMBODIMENTS

There will be explained below an embodiment of the present invention with reference to the drawings. The explanation refers to the case of a band saw blade, but is applicable to a round saw blade or the like.

Figure 1A:
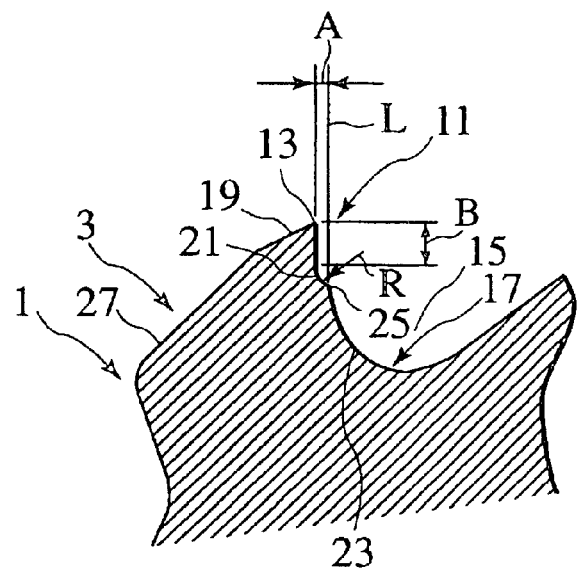
FIGS. 1A, 1B and 1C are explanatory diagrams of a saw blade and a saw teeth shape according to an embodiment of the present invention.
Figure 1B:
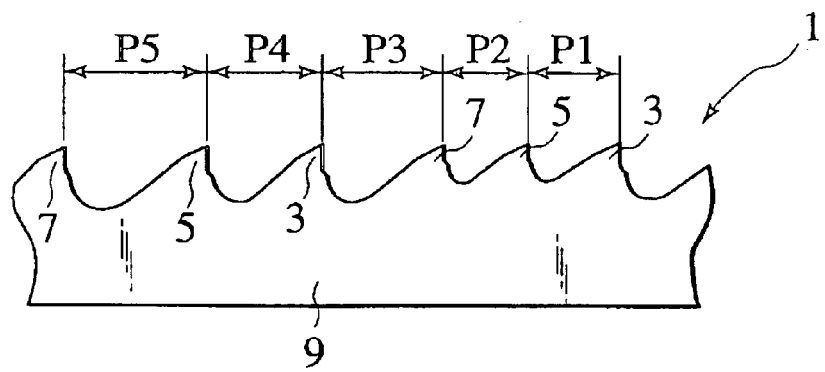
Figure 1C:
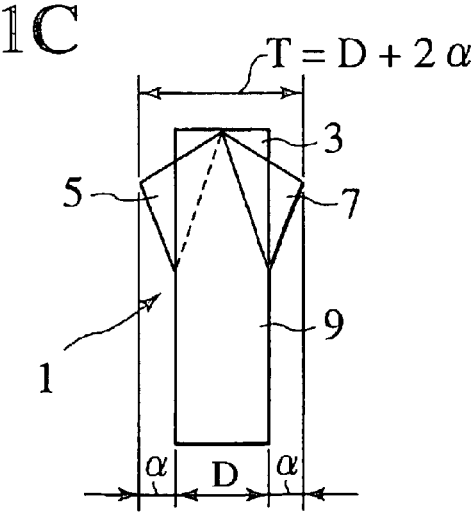

With reference to FIGS. 1A, 1B and 1C, a saw blade 1 according to the embodiment of the present invention has an unset tooth 3, and left and right set teeth 5 and 7. The unset tooth 1 is not set to a right-and-left direction viewed from a cutting direction of the saw blade (a running direction of the band saw blade with respect to a workpiece, a tangential direction of the round saw blade). The set teeth 5 and 7 are set to the right-and-left direction. When a thickness of a body section 9 of the saw blade 1 is D and a total set width of both the left and right set teeth 5 and 7 is T, a relationship is established according to an equation $T=D+2\alpha$. The coefficient $\alpha$ is a setting amount of the left and right set teeth 5 and 7 to the right-and-left direction.

The coefficient a establishes the following relationship with respect to the various widths D of the body section 9 of the saw blade 1, and the set width of a prior general saw blade is set to be small. Namely, When $0.85$ mm $\leq D \leq 0.95$ mm, $0.15$ mm $\leq \alpha \leq 0.35$ mm, and $0.15$ mm $\leq \alpha \leq 0.3$ mm is desirable in order to set the set width smaller.

When $0.96$ mm $\leq D \leq 1.2$ mm, $0.2$ mm $\leq \alpha \leq 0.4$ mm, and $0.2$ mm $\leq \alpha \leq 0.35$ mm is desirable in order to set the set width smaller.

When $1.2$ mm $< D \leq 1.5$ mm, $0.25$ mm $\leq \alpha \leq 0.43$ mm, and $0.25$ mm $\leq \alpha \leq 0.4$ mm is desirable in order to set the set width smaller.

When $1.5$ mm $\leq D < 1.7$ mm, $0.3$ mm $\leq \alpha \leq 0.5$ mm, and $0.3$ mm $\leq \alpha \leq 0.45$ mm is desirable in order to set the set width smaller.

When $1.7$ mm $< D$, $0.35$ mm $\leq \alpha \leq 0.6$ mm, and $0.35$ mm $\leq \alpha \leq 0.55$ mm is desirable in order to set the set width smaller.

The coefficient $\alpha$ is set within the experimentally desirable range. As the coefficient $\alpha$ is smaller, the whole cutting force becomes smaller, and a load, which is put on the body section 9 of the saw blade 1 at the time of cutting a workpiece, is reduced. It is desirable for improvement of the life of the body section, but when the coefficient a becomes too small, an internal stress of the workpiece is released due to the cutting of the workpiece. As a result, a phenomenon that a width of the cutting groove becomes narrow due to the saw blade 1 occurs, and a phenomenon that the saw blade 1 is caught by the workpiece. For this reason, there is a limit in reducing the coefficient $\alpha$.

In addition, when the value of the coefficient a is set to be large, the set width becomes large similarly to the prior art, and the bending of the set teeth becomes large. The inclination angle of the set teeth becomes large and the whole cutting force becomes large, and the load which is put on the body section 9 of the saw blade 1 becomes large. As a result, this is not desirable for the improvement of the life of the body section.

Therefore, the coefficient $\alpha$ is set experimentally within the desirable range.

In the saw blade 1, respective pitches P1 through P5 of the unset tooth 3 and the left and right set teeth 5 and 7 in a combination pattern where a plurality of saw teeth are combined are set to be unequal. Moreover, the small-diameter curl forming section 11 for slightly curling chips generated at the time of cutting a workpiece is provided to the points of the respective saw teeth 3, 5 and 7.

More specifically, the small-diameter curl forming section 11 has a plane rake face 19 and a curved face 21. The rake face 19 extends by a predetermined length B from the point 13 of the saw tooth 3 (the saw teeth 5 and 7) to a direction of a bottom portion 17 of a gullet section 15 of the saw blade 1. The curved face 21 is provided along an arc of a radius R continuously to the rake face 19. A vertical line L is drawn from a cross position 25 between the arc-like curved face 21 and a gullet forming curved face 23 forming the gullet section 15 to a direction of the cutting by means of the saw tooth 3 (the running direction of the band saw blade, the tangential direction of the round saw blade). When a dimension from the vertical line L to the point 13 of the saw tooth 3 is A, a relationship that $R/2 < A \leq 2R$ is established. The dimension A is set to be larger than the dimension of the prior example.

When the dimension A of the small-diameter curl forming section 11 is set to be large in such a manner, chips which are generated at the time of cutting a workpiece move along the rake face 19 so as to reach the arc-like curved face 21. At this time, the chips can be curled more securely along the curved face 21. When the dimension A becomes too small, restricting time of the chips by means of the arc-like curved face 21 (restricting distance) is short, and the curling diameter of the chips becomes larger, that is not desirable. However, the pitches of the respective teeth in the saw teeth combined pattern are set to be unequal so that the curling diameter can be the same as that in the prior example.

Namely, relationships that $A \leq R/2$, $B \leq 2$ mm, $0.5$ mm $\leq R \leq 3$ mm can be established. Even in the case where the dimension of the small-diameter curl forming section 11 is set to be the same as that of the prior example, since the pitches of the respective teeth are unequal, it is restrained that the chips are cut into pieces, and the chips are curled satisfactorily. As a result, the set width can be narrower than the set width of the prior saw blade.

When the dimension A of the small-diameter curl forming section 11 of the saw tooth 3 is set to be large as mentioned above, the curling diameter of the chips wound like a spring can be small. This is desirable for further reducing the set width T. A flank 27 of the saw tooth 3 or the like is formed into a suitable shape.

Figure 2A:
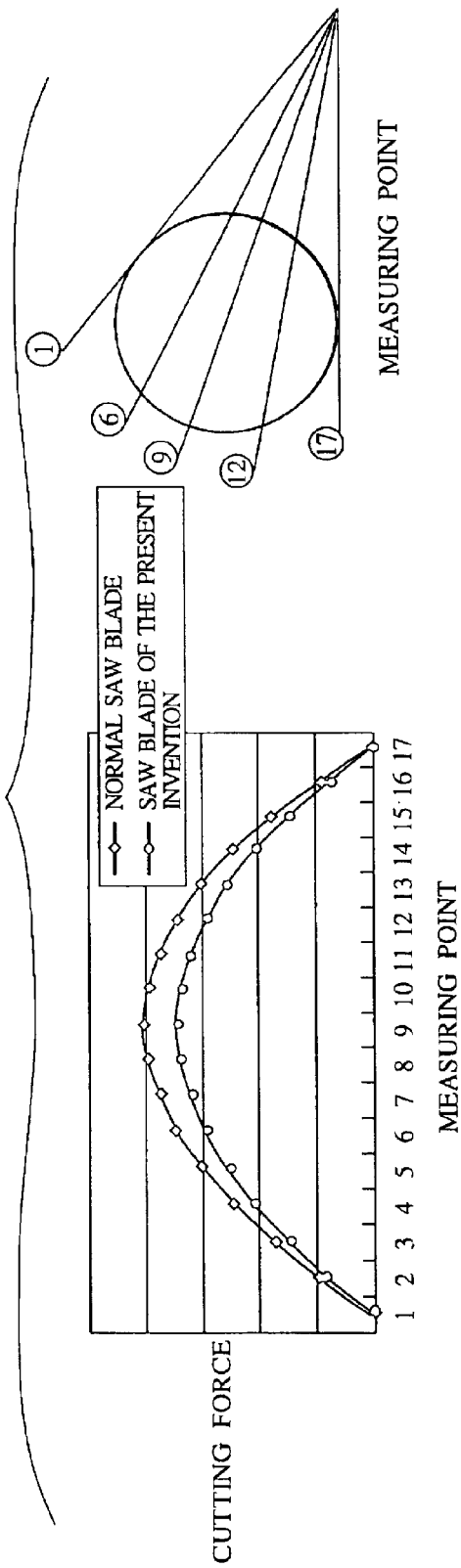
FIGS. 2A and 2B are graphs showing measured results of a cutting force when one kind of workpiece is cut by the saw blade according to the embodiment of the present invention and by a saw blade with a prior set width under the same cutting condition.
Figure 2B:
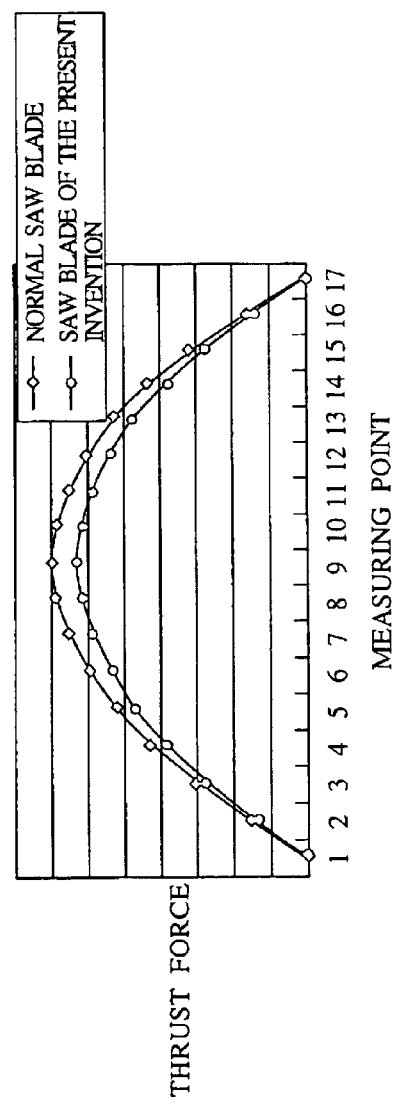

In the above structure, a workpiece (material: SCM 440 and its diameter is 250 φ) is cut by the saw blade with normal set width, in which the thickness D of the body section in the saw blade and the pitches P of the saw teeth and the saw teeth shape are the same as above ones and the coefficient α is 0.42 mm, and by the saw blade with narrow set width, in which α is 0.25 mm, under the same condition. As shown in FIGS. 2A and 2B, the cutting forces, i.e., a cutting force and a thrust force are greatly different between both the cases that the workpiece is cut by the saw blade with normal set width and by the saw blade with narrow set width.

Figure 3:
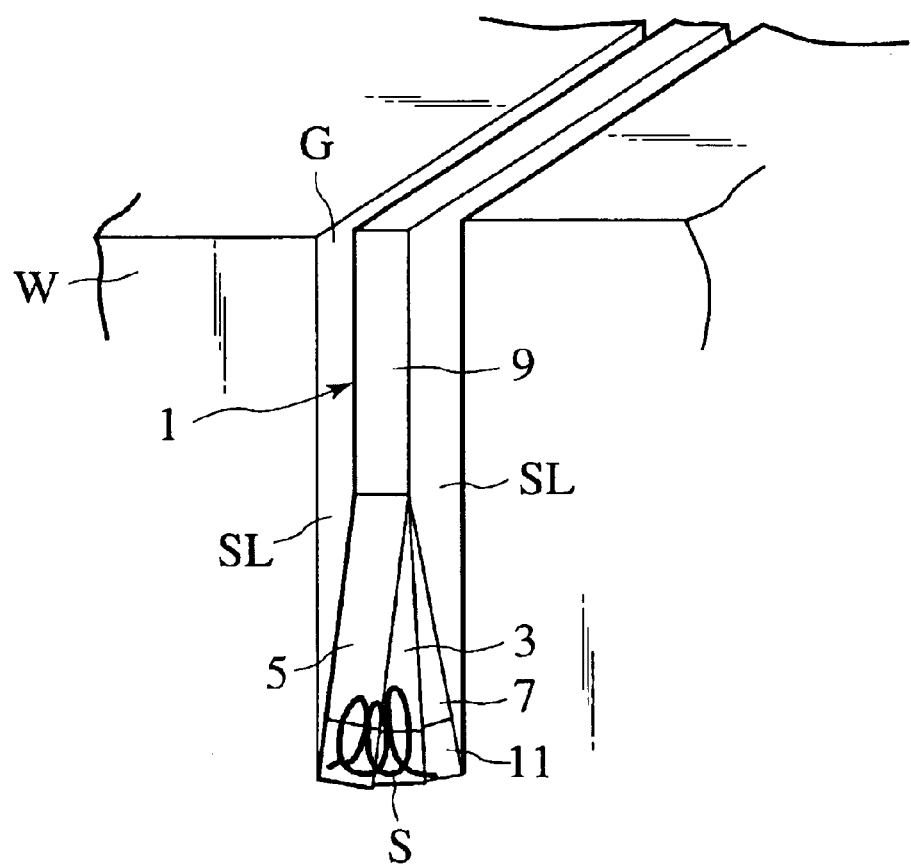
FIG. 3 is an explanatory diagram showing a state of chips when a workpiece is cut by the saw blade.

As shown in FIG. 3, the chips S being generated are curled into a small-diameter coil or spring shape at the small-diameter curl forming section 11 and are positioned in the gullet 15 of the saw blade 1. An amount of the chips that enter the gaps SL between the side face of the saw blade 1 and the inner face of the cutting groove G is slight so that the gaps SL are not clogged. Namely, since the set width of the left and right set teeth 5 and 7 is small and the bending to the right-and-left direction is small, the inclination angle of the set teeth is small. For this reason, a tendency of the generated chips to flow sideways is low, and the chips are curled so as to remain in the gullet 15.

In addition, since the pitches P of the saw teeth are unequal, chatter vibration of the saw blade 1 is prevented so that the cutting of the chips into pieces due to the chatter vibration is prevented and the chips are continuous chips. The chips are curled satisfactorily at the small-diameter curl forming section so as to have small diameter, and thus clogging does not occur. Further, since the cutting force is small, a nose at the time of the cutting is reduced, and accuracy of the cut section is improved.

Namely, according to the embodiment of the present invention, since the set width of the saw blade is set to be smaller than the set width of the prior saw blade, the cutting force can be small, and the load which is put on the body section of the saw blade is reduced so that the life of the body section can be improved. Moreover, the curling diameter of the chips into spring shape or the like generated at the time of cutting a workpiece can be small, and the ejection characteristic of the chips can be improved. Furthermore, since the set width of the saw blade can be narrow, an amount of chips of an expensive material can be small, and the yielding can be improved.

Figure 4A:
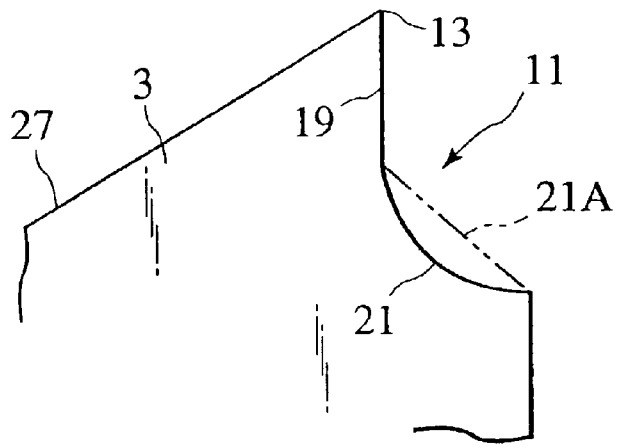
FIGS. 4A, 4B and 4C are explanatory diagrams showing the saw teeth shape.

As for the shape of the small-diameter curl forming section 11 of the saw tooth 3 or the like, as mentioned above, the structure having the rake face 19 and the arc-like curved face 21 is desirable. However, as shown by an imaginary line 21A in FIG. 4A for example, the arc-like curved face 21 can be formed on a suitable inclined face. In this case, the curling diameter of the chips are different according to the inclination angle of the inclined face 21A, and the chips are occasionally folded. As a result, this inclined face is not very desirable.

Figure 4B:
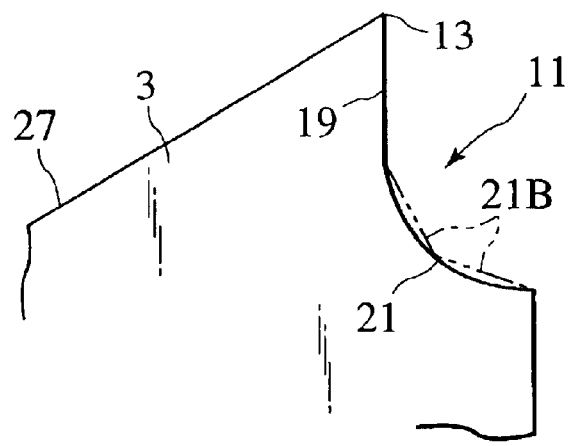
Figure 4C:
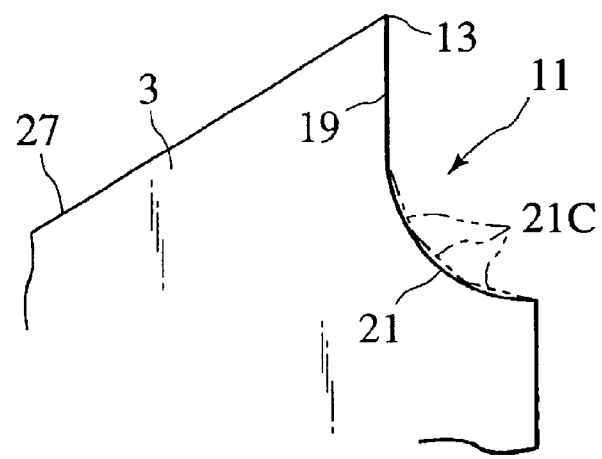

Further, as shown in FIGS. 4B and 4C, a plurality of inclined faces 21B and 21C are provided along the arc-like curved face 21 so that a polygonal concave face can be formed. In this case, since the shapes are along the arc-like curved face 21 to some degree, these shapes are more desirable than a simple inclined face.

Figure 5:
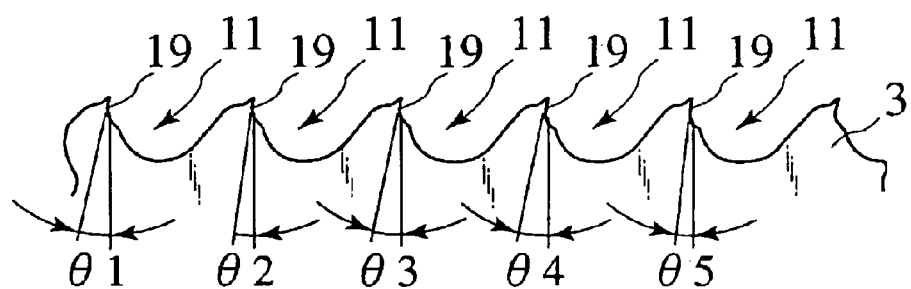
FIG. 5 is an explanatory diagram showing various modes of a rake angle of a small-diameter curl forming section formed on the saw teeth.

In addition, as schematically shown in FIG. 5, the rake angles of the rake faces 19 of the small-diameter curl forming sections 11 of the respective saw teeth 3 or the like are $\theta 1, \theta 2, \ldots \theta 5$. The rake angles $\theta 1, \theta 2, \ldots \theta 5$ are set to be equal with each other, or different from each other, or a suitable number of the rake angles $\theta 1, \theta 2, \ldots \theta 5$ are equal with each other. In such a manner, it is desirable that the rake angles $\theta 1, \theta 2, \ldots \theta 5$ are set suitably according to the height dimensions and the pitches of the saw teeth or correspondingly to the unset tooth or left and right set teeth.

For example, in order to improve a cutting characteristic for a workpiece, the rake angle θ of the saw tooth with high height of the saw blade is set to be large and the points 13 of the saw teeth have more acute angles. Moreover, in the case of saw teeth with large pitches, the cutting load becomes large. For this reason, the rake angles θ is set to be smaller and the angles of the points 13 of the saw teeth are made to be larger so that the wear and abrasion resistance is improved. In such a manner, it is desirable to set the rake angles θ to desirable angles according to the function and load of the respective saw teeth.

Figure 6:
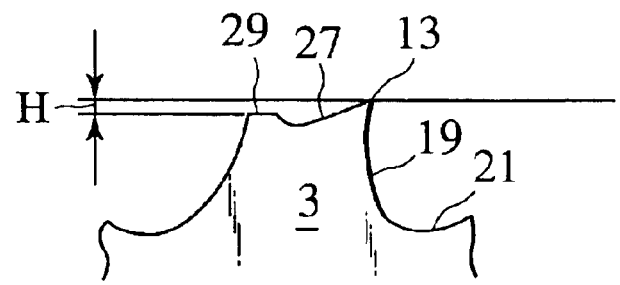
FIG. 6 is an explanatory diagram showing the saw teeth shape.

Further, as for the shape of the saw teeth 3 or the like, as shown in FIG. 6, a very small projection 29 may be provided onto the flank 27 of the saw tooth 3. In this case, the very small projection 29 is formed so as to be lower by a dimension H from the point 13 of the saw tooth 3. Therefore, in the case where chipping of tooth occurs at the point 13 for example, the very fine projection 29 comes in contact with the workpiece W so as to limit deep cutting of the saw teeth 3 or the like due to the workpiece. As a result, abrupt increase of the load due to the chipping of tooth or the like is limited.

As understood, the small-diameter curl forming section 11 can be formed at the points of the saw tooth 3 or the like regardless of the shapes of the saw tooth or the like. For this reason, the small-diameter curl forming section 11 is formed on the respective saw teeth of the prior saw blades so that the chips generated at the time of cutting a workpiece can be curled into a small-diameter spring form. Moreover, the set width can be smaller.

Figure 7:
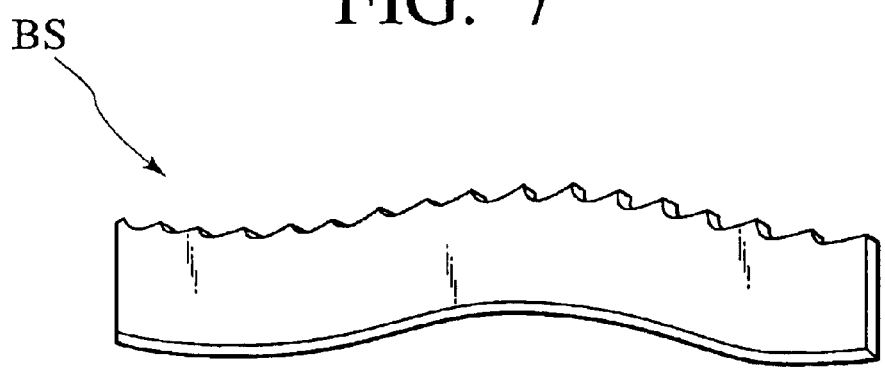
FIG. 7 is an explanatory diagram showing a band saw blade.
Figure 8:
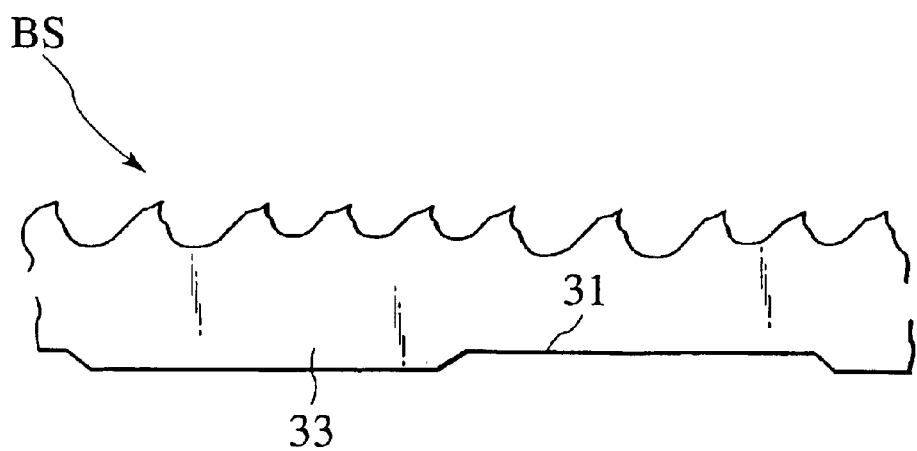
FIG. 8 is an explanatory diagram showing a band saw blade.
Figure 9:
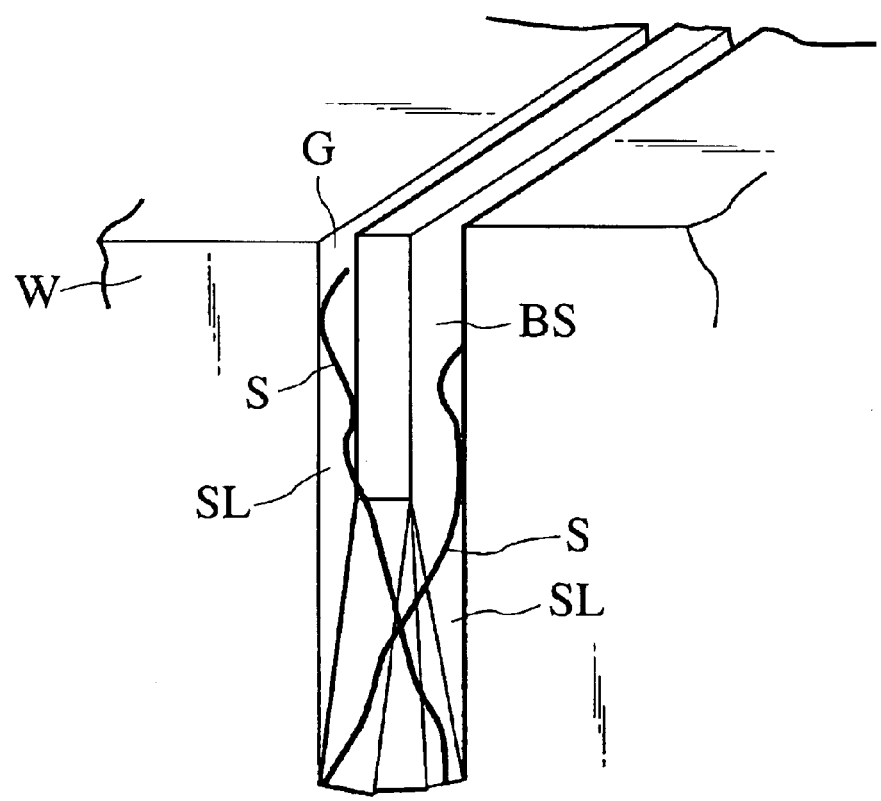
FIG. 9 is an explanatory diagram showing chips when a workpiece is cut by a prior saw blade.

Further, the band saw blade BS can have a sine curve shape as shown in FIG. 7, or can be constituted so that a concave section 31 and a convex section 33 having suitable length are provided alternatively to a rear face with suitable intervals as shown in FIG. 8.

With such structures, the workpiece is gradually cut by the saw teeth so that the cutting characteristic for the workpiece having work hardening characteristic is improved.

Moreover, a length of the chips generated at the time of cutting the workpiece is cut periodically so that excessive lengthening of the chips is regulated. Therefore, an outer diameter of curls of the chips formed at the small-diameter curl forming section 11 formed on the saw teeth can be prevented from becoming large excessively.

In the saw blade, in the structure having a plurality of saw teeth with different tooth heights, the set width of the saw teeth with small height is set to be larger than the set width of the saw teeth with large height similarly to the prior saw blade. Further, the set width T of the saw teeth with small height is set so that the equation (T=D+2α) is satisfied. Therefore, the maximum set width of the saw blade is set so as to smaller than the maximum set width of the prior general saw blade.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A saw blade, comprising:
   an unset tooth;
   a left set tooth;
   a right set tooth;
   wherein the left set tooth and the right set tooth are set to a right-and-left direction;
   wherein when a thickness of a body section of the saw blade is D, and a set width is T, and where α is a setting coefficient, a relationship that T=D+2α is established;
   wherein a relationship between the thickness D of the body section and the coefficient α is established in a manner such that
   when 0.85 mm≦D≦0.95 mm, 0.15 mm≦α≦0.35 mm is established;
   when 0.96 mm<D≦1.2 mm, 0.2 mm≦α≦0.4 mm is established;
   when 1.2 mm<D≦1.5 mm, 0.25 mm≦α≦0.43 mm is established;
   when 1.5 mm<D≦1.7 mm, 0.3 mm≦α≦0.5 mm is established; or
   when 1.7 mm<D, 0.35 mm≦α≦0.6 mm is established;
   wherein a small-diameter curl forming section for small curling chips generated at the time of cutting a workpiece is provided at a tip portion of saw teeth;
   wherein the small-diameter curl forming section has a plane rake face, which extends by a predetermined length from the point of the saw tooth to a direction of a gullet bottom section of the saw blade, and a curved face which is continuous to the rake face;
   wherein in the case where a vertical line is drawn from a cross position between the curved face and a gullet forming curved face forming the gullet section towards a direction of the cutting by means of the saw teeth, when a dimension from the vertical line to the point of the saw tooth is A and when a radius of the curved face is R, a relationship that R/1.5<A≦2R is established; and
   wherein the cross position between the curved face and the gullet forming curved face is protruded from the curved face and the gullet forming curved face.

2. The saw blade according to claim 1, wherein pitches of the saw teeth are unequal with each other.

3. The saw blade according to claim 1 having a sine curve shape.

* * * * *